United States Patent
Diochon et al.

(10) Patent No.: US 8,070,093 B2
(45) Date of Patent: Dec. 6, 2011

(54) TURBOJET ENGINE MOUNTING STRUCTURE FOR AIRCRAFT

(75) Inventors: Lionel Diochon, Toulouse (FR); Jean-Michel Cetout, Toulouse (FR); Laurent Lafont, Pechbusque (FR); David Chartier, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 916 days.

(21) Appl. No.: 12/089,058

(22) PCT Filed: Jun. 29, 2006

(86) PCT No.: PCT/EP2006/066873
§ 371 (c)(1), (2), (4) Date: Apr. 3, 2008

(87) PCT Pub. No.: WO2007/039556
PCT Pub. Date: Apr. 12, 2007

(65) Prior Publication Data
US 2008/0315033 A1 Dec. 25, 2008

(30) Foreign Application Priority Data
Oct. 3, 2005 (FR) ....................... 05 52989

(51) Int. Cl.
B64D 27/26 (2006.01)

(52) U.S. Cl. ......................................... 244/54

(58) Field of Classification Search ................ 244/54; 60/797; 248/554
See application file for complete search history.

(56) References Cited

U.S. PATENT DOCUMENTS

| 4,013,246 | A | 3/1977 | Nightingale |
| 4,206,893 | A * | 6/1980 | Howard ................... 244/54 |
| 6,095,456 | A | 8/2000 | Powell |
| 6,126,110 | A | 10/2000 | Seaquist et al. |
| 2005/0116093 | A1 | 6/2005 | Machado et al. |
| 2005/0274485 | A1 * | 12/2005 | Huggins et al. ........... 164/349 |

FOREIGN PATENT DOCUMENTS
EP 1 053 937 11/2000

OTHER PUBLICATIONS
U.S. Appl. No. 11/915,223, filed May 1, 2008, Diochon, et al.

* cited by examiner

Primary Examiner — Tien Dinh
Assistant Examiner — Richard R Green
(74) Attorney, Agent, or Firm — Oblon, Spivak, McClelland, Maier & Neustadt, L.L.P.

(57) ABSTRACT

A mount for an aircraft turbojet engine. The mount includes a central box formed by an assembly of two side panels joined via transverse ribs and two side boxes secured to a forward part of the box and arranged either side thereof, each side box including an aft closure frame. One of the ribs forming the box includes two side extensions made in a single piece with the rib and respectively projecting from the two side panels outwardly from the box, the two extensions being fixedly mounted on the frame of each of the two side boxes, respectively.

15 Claims, 10 Drawing Sheets

TURBOJET ENGINE MOUNTING STRUCTURE FOR AIRCRAFT

TECHNICAL AREA

The present invention generally relates to a securing pylon for an aircraft turbojet engine. This type of securing pylon, also called <<EMS>> for Engine Mounting Structure, is used to suspend the turbojet engine below the wing of the aircraft, or to mount this turbojet engine above this same wing.

STATE OF THE PRIOR ART

Said engine mount is provided to form a connecting interface between a turbojet engine and an aircraft wing. It allows the loads generated by its associated turbojet engine to be transmitted to the airframe, and also provides a path for fuel, electric and hydraulic systems, and air between the engine and the aircraft.

To ensure load transmission, the engine mount comprises a rigid structure, often of <<box>> type i.e. formed by the assembly of upper and lower spars and of two side panels joined together via transverse ribs.

Also, the engine mount is provided with a mounting system positioned between the turbojet engine and the rigid structure of the engine mount, this system globally comprising at least two engine attachments, generally at least one forward attachment and at least one aft attachment.

Additionally, the mounting system comprises a thrust mount device transferring thrust loads generated by the turbojet engine. In the prior art, this device is in the form of two side links for example, joined firstly to an aft part of the fan case of the turbojet engine and secondly to an aft attachment secured to the central engine case.

Similarly, the engine mount also comprises a second mounting system positioned between the rigid structure of this engine mount and the aircraft wing, this second system generally consisting of two or three attachments.

Finally, the engine mount is provided with a secondary structure to separate and support the different systems whilst carrying aerodynamic cowling.

As mentioned above, a conventional engine mount of the prior art is roughly in the shape of a parallelepiped box of large dimensions so that it is able to transfer the entirety of the loads generated by the associated turbojet engine.

Therefore, in this precise case in which the engine mount, in the form of a large-sized box, is arranged in the vicinity of the central case of the turbojet engine, this engine mount inevitably causes major disturbances of the secondary airstream leaving the annular fan duct, which directly translates as major drag and losses in terms of turbojet engine yield and fuel consumption.

In addition, these disturbances are heightened by the presence of the thrust mount device of side link type, located at the outlet of the annular fan duct.

To confront these disadvantages, an engine mount has been proposed having a rigid structure comprising a longitudinal central box and two side boxes secured to a forward part of the central box, the engine mount also having a first and second forward engine attachment designed to transfer loads exerted along a longitudinal direction of the engine mount, these first and second forward engine attachments being respectively arranged on the two side boxes.

This proposed configuration can ensure the transfer of thrust loads i.e. those loads oriented in the longitudinal direction of the engine mount, via the two side boxes provided for this purpose. This transfer can be obtained in fully satisfactory manner in the sense that the thrust loads passing via the first and second forward attachments can then easily transit via the skins of these boxes, which can therefore be called working skins. Once these loads have been transferred to an upper end of the side boxes, they then arrive at the longitudinal central box through which they can be transferred in longitudinal direction towards the aft of the engine mount.

Similarly, it is to be understood that the transfer of the moment exerted in vertical direction is also ensured by the two side boxes, notably via a forward closure frame and an aft closure frame provided on each of these boxes, and optionally via an intermediate frame located between the two above-mentioned closure frames.

Finally, the same applies to the transfer of the moment exerted in the longitudinal direction of the engine mount, this transfer effectively having to be ensured by the side boxes when the first and second forward attachments are also designed to transfer loads exerted in the vertical direction of the engine mount.

Also, as indicated above, the rigid structure of the engine mount comprises a longitudinal central box, also called central torque box, which extends parallel to the longitudinal axis of the fictitious surface, and which is therefore secured to each of the side boxes. Evidently, the mechanical resistance provided by the side boxes allows the central box to be sized with smaller dimensions than those used in the prior art, chiefly regarding its thickness. This implies that this central box is also able only to cause very slight disturbance of the secondary airstream leaving the annular fan duct.

However this type of rigid structure, also called primary structure of the engine mount, has a non-negligible drawback lying in the lack of satisfactory means to ensure high-performance securing of all the frames of each side box onto the longitudinal central box, whilst offering easy mounting.

SUMMARY OF THE INVENTION

The purpose of the invention is therefore to propose an aircraft turbojet engine mount which remedies at least in part the above-mentioned drawbacks connected with the prior art, and also to present an aircraft having said engine mount.

For this purpose, the subject of the invention is an aircraft turbojet engine mount, the engine mount having a rigid structure comprising a longitudinal central box formed by the assembly of two side panels joined via transverse ribs, the rigid structure also comprising two side boxes secured to a forward part of the central box and arranged either side thereof, each side box having at last one frame such as a forward closure frame or an aft closure frame, or an intermediate frame located inside the box. According to the invention, one of said transverse ribs forming the longitudinal central box is equipped with two side extensions made in a single piece with this rib and respectively projecting from the two side panels of the longitudinal central box outwardly from the box. Also, the two side extensions are fixedly mounted on the above-mentioned frame of each of the two side boxes respectively.

Therefore in the preferred, but non-limiting case, in which the above-indicated frame is the aft closure frame of the box, the proposed engine mount advantageously provides original, high-performance securing of these aft closure frames onto the longitudinal central box of the rigid structure, through the presence of the side extensions which are therefore fully secured to one of the transverse ribs forming the longitudinal central box. The presence of this part made in a single piece, that is a constituent part of the central box and sets up a mechanical junction between this box and each of the two aft closure frames, effectively allows safe, satisfactory transfer to be obtained of those loads transiting in the side boxes in the direction of the central box.

Also, with this solution, the mechanical joining of the aft closure frames onto the central box is very easy and quick to perform, since the positioning of the side extensions used to join these closure frames is obtained automatically when positioning the transverse rib of the central box carrying these extensions. The assembly operations of the rigid structure of the engine mount can therefore be advantageously shortened.

Evidently, the frames on which the two side extensions are intended to be fixedly mounted could alternatively be forward closure frames of the box, or intermediate frames also called inner frames since they are located inside the box, without departing from the scope of the invention. Generally it is indicated that these various frames, also called stiffeners, carry lower and upper skins of the associated box, and are preferably arranged along transverse planes. In addition, they each play a structural role within the associated box.

Preferably, still in the preferred but non-limiting case in which the above-cited frame is the aft closure frame of the box, it is noted that the aft frame of each of the two side boxes has a core either side of which there is a lower bearing plate and an upper bearing plate, the side extensions each having a first portion fixedly mounted on the core of its associated closure frame.

To reinforce the mounting of the aft closure frames, provision may be made so that the side extensions each have a second portion fixedly mounted on the upper bearing plate of its associated closure frame.

Preferably, each of the side extensions is joined to the transverse rib via an extension support also made in a single piece with the transverse rib and the two side extensions, the extension support being arranged so as to block off an extension throughway made in the associated side panel. Therefore, the longitudinal central box can remain sealed by the housing of the extension supports in the extension throughways provided on the side panels.

Also, for each of the two side extensions, an outer surface of the extension support is positioned substantially in a same plane as an outer surface of the associated side panel. In this way good aerodynamic continuity is obtained on the side outer surfaces of the central box, despite the presence of extensions projecting outwardly from the box.

The engine mount may also comprise an additional transverse rib superimposed on the transverse rib equipped with the two side extensions, this additional transverse rib also being equipped with two additional side extensions made in a single piece with this rib and respectively projecting outwardly from the two side panels of the longitudinal central box. Also, the two additional side extensions are fixedly mounted on the aft closure frame of each of the two side boxes, respectively.

It will be understood that this additional transverse rib and the two additional side extensions jointly form a single part substantially identical to the one previously described. It can therefore fulfil a failsafe role i.e. it can ensure the operating functions of the first single part made in a single piece, in the event of rupture or failure of this first part. Nevertheless, this second part made in a single piece could also be used simply to reinforce the mechanical support provided by the first part, without departing from the scope of the present invention.

In said case, provision may be made so that for each of the two side boxes, a side extension and an additional side extension are arranged either side of a core of the aft closure frame.

In addition, still in the case in which the aft frame of each of the two side boxes has a core on either side of which there is a lower bearing plate and an upper bearing plate, provision is then preferably made so that the additional side extensions each have a first portion fixedly mounted on the core of its associated closure frame, and optionally a second portion fixedly mounted on the upper bearing plate of this same frame.

Evidently, both for the side extensions and for the additional side extensions, only the second above-mentioned portion could be provided, fixedly mounted on the upper bearing plate of the aft closure frame, without departing from the scope of the invention.

Here again, each of the additional side extensions is joined to the additional transverse rib via an additional extension support also made in a single piece with the additional transverse rib and the two additional side extensions, the additional extension support being arranged so as to close a throughway for an additional extension, made in the associated side panel.

Therefore, for each of the two additional side extensions, an outer surface of the support for an additional extension lies substantially in a same plane as an outer surface of the associated side panel.

In this manner, these specificities respectively enable the longitudinal central box to remain sealed by housing the supports for the additional extensions in the throughways for additional extensions provided on the side panels, and provide good aerodynamic continuity on the side outer surfaces of the central box, despite the presence of the additional extensions projecting outwardly from the box.

In this respect, provision can be made so that, for each of the two side panels of the longitudinal central box, the throughway for an extension and the throughway for an additional extension jointly form a single throughway closed by the supports for extensions and the supports for additional extensions.

Preferably, the two side boxes each have a lower skin jointly delimiting one part of a fictitious, substantially cylindrical surface of circular section, and having a longitudinal axis preferably intended to merge with the longitudinal axis of the turbojet engine.

Hence, each of the two lower skins has a curvature enabling it to extend around this substantially cylindrical, fictitious surface of circular section. They therefore jointly form an assembly of the rigid structure which advantageously has only very little constraint in terms of disturbance of the secondary airstream leaving the annular fan duct of its associated turbojet engine, as compared with conventional prior art solutions in which the engine mount is in the form of a single, central, parallelepiped box of large size, arranged very close to the central case of the turbojet engine.

It is effectively possible to provide that a diameter of the fictitious surface is substantially identical to a diameter of an outer cylindrical surface of the fan case of the associated turbojet engine, which means that the rigid assembly formed by the lower skins then lies substantially in the continuity of this outer surface of the fan case, and more generally in the continuity of a peripheral annular part of this case. Evidently, in this precise case in which the two side boxes are similar to a substantially cylindrical portion of casing, of circular section and having a diameter close to the diameter of the fan case, the disturbances of the secondary airstream which may be caused by these boxes are extremely slight, and even more or less inexistent.

This advantageously allows gains to be achieved in terms of drag, turbojet engine yield and fuel consumption.

By way of indication, it is noted that if the two side boxes are generally similar to a substantially cylindrical casing portion with circular section, it is preferably in the form of a substantially cylindrical casing portion with semi-circular section. Evidently this preferred form is fully adapted to ensure easy mounting of the turbojet engine on the rigid structure of the engine mount.

Also, as indicated above, the longitudinal central case positioned between the two side boxes is arranged so that it only generates very slight disturbance of the secondary airstream. For this purpose, it can be provided that only a very minute portion of its lower part projects inside the fictitious surface.

A further subject-matter of the invention is an aircraft comprising at least one engine mount such as the one just presented.

Other advantages and characteristics of the invention will become apparent from the detailed, non-limiting description given below.

BRIEF DESCRIPTION OF THE DRAWINGS

This description is made with reference to the appended drawings amongst which.

DETAILED DESCRIPTION OF PREFERRED EMBODIMENTS

Figure 1:
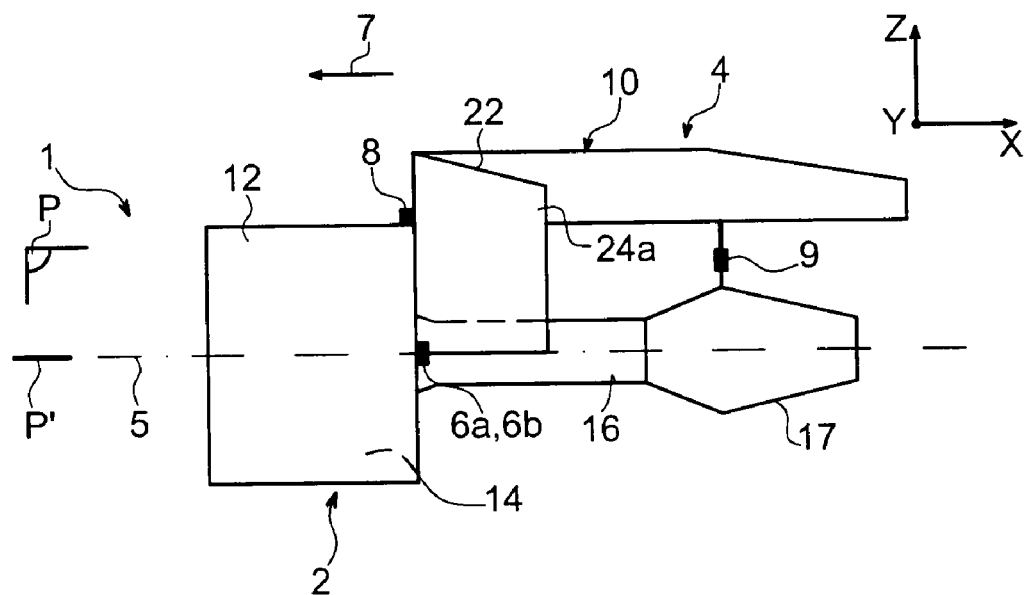
FIG. 1 is a schematic side view of an aircraft engine assembly comprising an engine mount according to one preferred embodiment of the present invention.

With reference to FIG. 1, an aircraft engine assembly 1 can be seen intended to be secured below a wing of this aircraft (not shown), this assembly 1 comprising an engine mount 4 according to a preferred embodiment of the present invention.

Globally, the engine assembly 1 consists of a turbojet engine 2 and of the engine mount 4, this mount being provided in particular with a plurality of engine attachments 6a, 6b, 8, 9 and with a rigid structure 10 carrying these same attachments (attachment 6b being masked by attachment 6a in this FIG. 1). It is indicated that the assembly 1 is intended to be surrounded by a nacelle (not shown) and that the engine mount 4 comprises another series of attachments (not shown) to ensure the suspending of this assembly 1 below the aircraft wing.

In the remainder of the description, by convention, X is used to designate the longitudinal direction of the engine mount 4 which is similar to the longitudinal direction of the turbojet engine 2, this direction X being parallel to a centreline axis 5 of this turbojet engine 2. Also, Y designates the direction oriented transverse to the engine mount 4 and is also similar to the transverse direction of the turbojet engine 2, and Z is the vertical direction or height, these three directions X, Y and Z lying orthogonal to one another.

Also the terms <<forward>> and <<aft>> are to be considered with respect to a direction of travel of the aircraft subsequent to the thrust exerted by the turbojet engine 2, this direction being represented by an arrow 7.

In FIG. 1, it can be seen that only the engine attachments 6a, 6b, 8, 9 and the rigid structure 10 of the engine mount 4 are illustrated. The other constituent elements which are not shown of this engine mount 4, such as the mounting means for the rigid structure 10 below the aircraft wing, or the secondary structure to separate and support the different systems whilst carrying aerodynamic cowling, are conventional parts identical or similar to those found in the prior art and known to those skilled in the art. Therefore no detailed review is given thereof.

Also, the turbojet engine 2 forwardly has a fan case 12 of large size delimiting an annular fan duct 14, and towards the aft comprises a central case 16 of smaller size enclosing the core of this turbojet engine. Finally, the central case 16 is extended aft by an exhaust case 17 of larger size than the central case 16. Cases 12, 16 and 17 are evidently secured to each other.

As can be seen FIG. 1, a first forward engine attachment 6a and a second forward engine attachment 6b are both intended to be secured to the fan case 12, symmetrically relative to a plane P defined by centreline 5 and direction Z.

Figure 2:
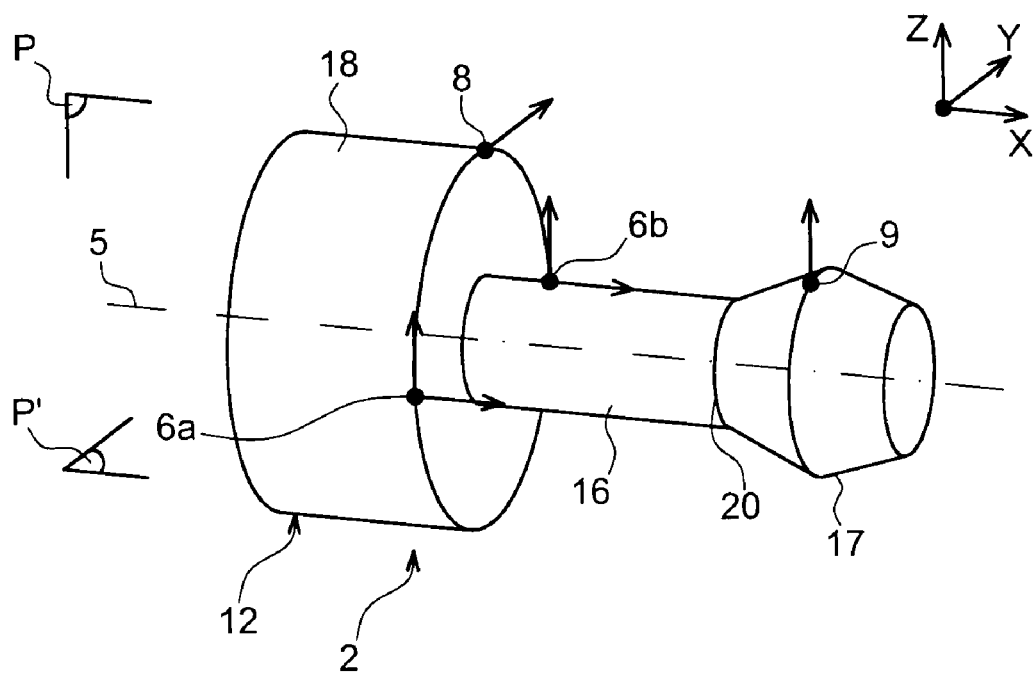
FIG. 2 is a schematic, perspective view of the assembly shown FIG. 1, the rigid structure of the engine mount having been withdrawn for better clarity of the engine attachments of this same mount.

With reference now to FIG. 2, it can effectively be seen that the first attachment 6a and the second attachment 6b schematically illustrated are arranged symmetrically relative to this plane P, and are preferably both arranged on a peripheral annular part of the fan case 12, and more precisely on the aft of this same part.

It can therefore be provided that the first and second forward engine attachments 6a, 6b lie diametrically opposite on the peripheral annular part having a cylindrical outer surface 18 of the fan case 12, so that these attachments 6a, 6b are each therefore crossed by a second plane P' defined by the longitudinal centreline 5 and direction Y.

As is schematically indicated by the arrows in FIG. 2, each of the first and second forward engine attachments 6a, 6b is designed so that it can transfer loads generated by the turbojet engine 2 in direction X and direction Z, but not those loads exerted in direction Y.

In this manner the two attachments 6a, 6b, spaced far apart from each other, jointly ensure transfer of the moment exerted in direction X, and of the moment exerted in direction Z.

Still with reference to FIG. 2, a third forward engine attachment 8 can be seen, schematically illustrated, and also secured on the peripheral annular part of the fan case 12, also preferably on the aft of this part.

Attachments 6a, 6b, 8 are secured on the peripheral annular part of case 12 via structural parts (not shown) of the engine, which are effectively preferably arranged on the aft of the peripheral annular part. Nonetheless, it is also possible to find engines whose structural parts are positioned more forwardly on the peripheral annular part, implying that the attachments 6a, 6b, 8 are also secured more towards the front of the engine, still on the peripheral annular part of the fan case 12.

Regarding the third attachment 8, this is positioned on the highest part of the fan case 12, hence on the highest part of the peripheral annular part, and the first plane P indicated above therefore passes fictitiously through it. Additionally, the three attachments 6a, 6b and 8 are preferably crossed by a plane YZ (not shown).

As schematically indicated by the arrows in FIG. 2, the third engine attachment 8 is designed so that it can transfer solely the loads generated by the turbojet engine 2 in direction Y, and therefore not those loads exerted in directions X and Z.

Still with reference to FIG. 2, an aft engine attachment 9 is schematically illustrated, and secured between the rigid structure 10 (not visible in this figure) and the exhaust case 17, preferably at the portion of this case 17 having the largest diameter. By way of indication, it is specified that this aft attachment 9 is preferably crossed fictitiously by the first plane P.

As is schematically indicated by the arrows in FIG. 2, the aft engine attachment 9 is designed so that it can transfer solely those loads generated by the turbojet engine 2 in direction Z, and therefore not those loads exerted in directions X and Y.

In this manner this attachment 9, jointly with the two forward attachments 6a, 6b, therefore ensures transfer of the moment exerted in direction Y.

Evidently, this aft attachment 9 could be positioned differently, namely on the central case 16 of the turbojet engine 2, preferably on an aft part thereof, or at a junction 20 between the central case 16 and the exhaust case 17.

It is noted that while the engine attachments 6a, 6b, 8 and 9 are schematically illustrated in FIGS. 1 and 2, it is to be appreciated that these attachments could be made in any form known to those skilled in the art, such as an assembly of links and brackets.

As mentioned previously, one of the chief advantages associated with the configuration just described lies in the fact that the specific positioning of the forward engine attachments 6a, 6b, 8 on the fan case 12 leads to considerably reduced bending of the central case 16 during various aircraft flight phases, and therefore leads to a significant decrease in wear through friction of the compressor and turbine blades against this central case 16.

Figure 3:
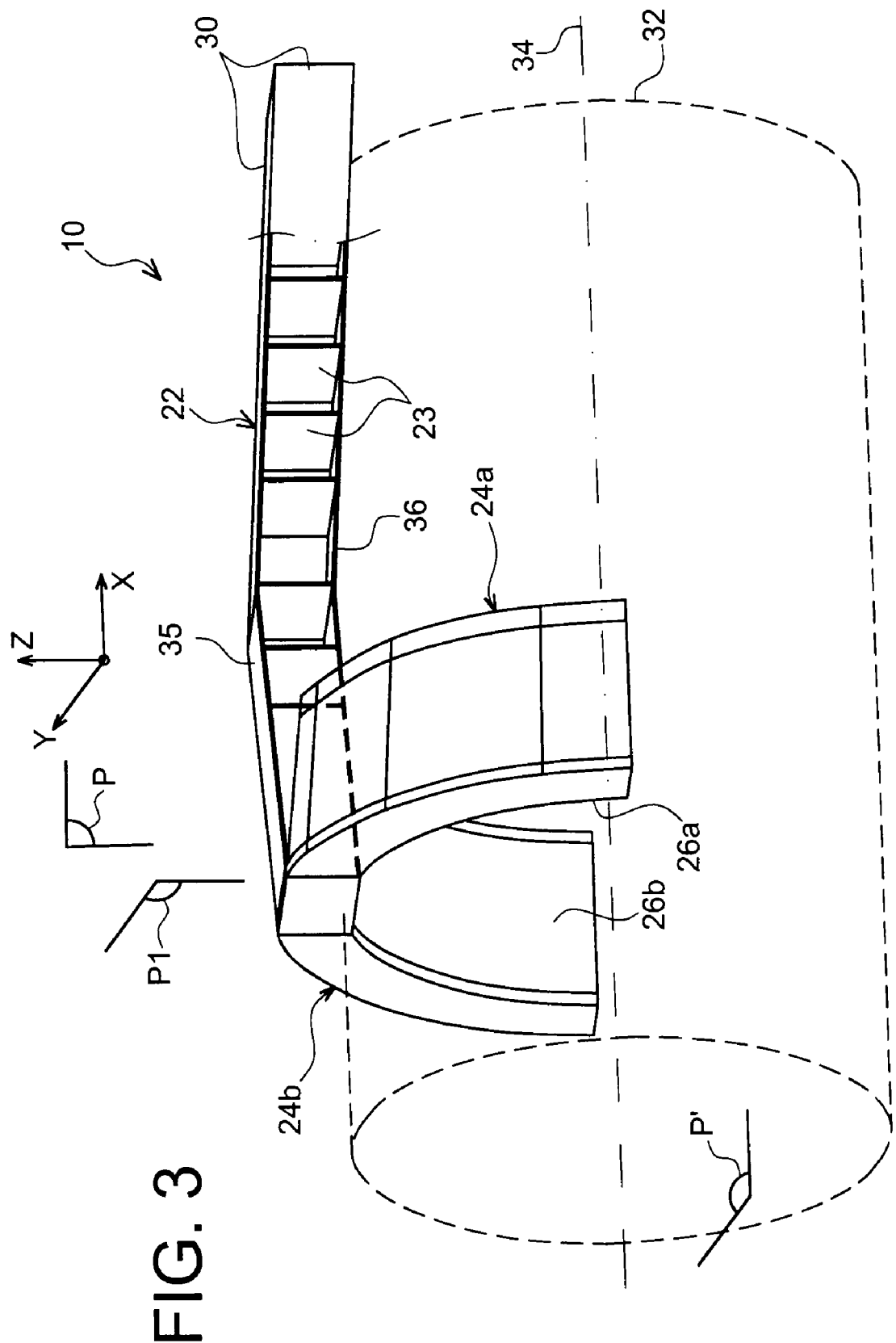
FIG. 3 is a partial, magnified perspective view of the engine mount according to the preferred embodiment.

With reference now to FIG. 3, a detailed view is given of the rigid structure 10 of the engine mount 4 subject of the present invention, the engine attachments 6a, 6b, 8, 9 being deliberately omitted in this figure.

First, it is indicated that this rigid structure 10 is designed so as to have symmetry relative to the first plane P mentioned above i.e. relative to the vertical plane defined by the longitudinal centreline 5 of the turbojet engine 2 and direction Z.

This rigid structure 10 comprises a longitudinal central box 22, also called a torque box, which extends from one end to the other of the structure 10 in direction X, parallel to this same direction. By way of indication, this box 22 can be formed by the assembly of two side panels 30 extending in direction X in parallel planes XZ, and joined together via transverse ribs 23 which are oriented in parallel planes YZ. Additionally, an upper spar 35 and a lower spar 36 are also provided to close the box 22. It is noted by way of indication that parts 30, 35 and 36 may each be made in a single piece or by the assembly of joining sections which may optionally lie slightly at an angle to each other.

Two side boxes 24a, 24b complete the rigid structure 10 whose central box lies at an upper portion of this same structure 10, each of the two boxes 24a, 24b being secured to the central torque box 22 and projecting downwardly either side thereof in direction Y.

One of the particular aspects of these side boxes secured to the forward part of the central case 22 is that they each have a lower skin 26a, 26b oriented towards the turbojet engine and jointly delimiting part of a substantially cylindrical fictitious surface 32 of circular section, and having a longitudinal axis 34 parallel to the central case 22 and to direction X, as can be seen FIG. 3.

In other words, these two lower skins 26a, 26b each have a curvature adapted so that they can be positioned around and in contact with this fictitious surface 32 over their entire length. Therefore in general the two boxes 24a, 24b together form a portion of a substantially cylindrical casing/cage of circular section, able to be positioned around and away from the central case 16 of the turbojet engine 2.

By way of indication, it is specified that axis 34 preferably merges with the longitudinal centreline 5 of the turboprop engine. Therefore it can be understood that the rigid structure 10 also has symmetry relative to a vertical plane defined by the longitudinal axis 34 and direction Z of the engine mount 4.

Figure 4:
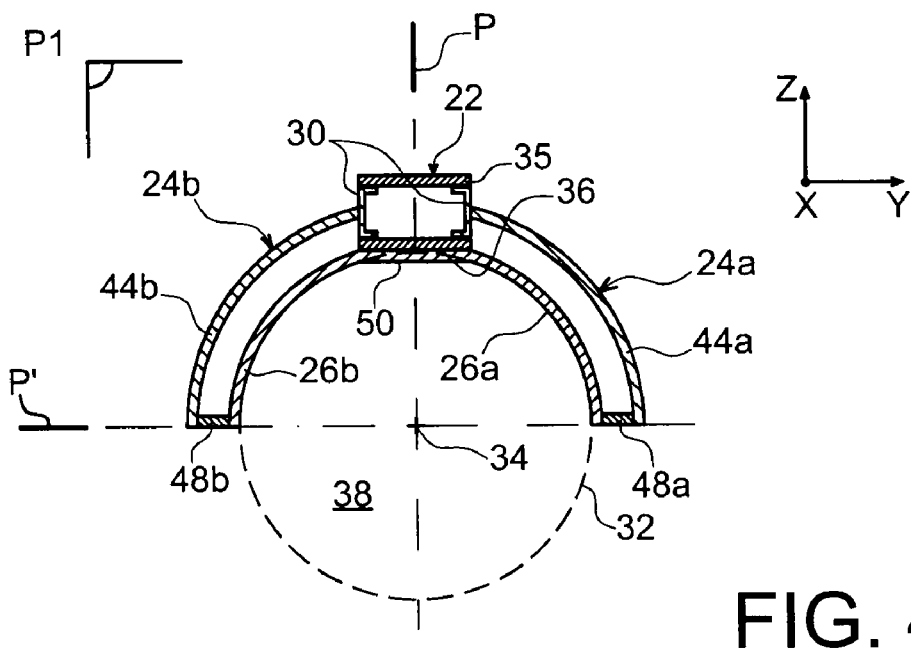
FIG. 4 is a sectional view along the transverse plane P1 in FIG. 3.

FIG. 4 is a sectional view along a transverse plane P1 passing through the side boxes 24a, 24b in any direction.

In this figure, it can effectively be seen that the two lower skins 26a, 26b with their outer surface delimit part of the substantially cylindrical fictitious surface 32 of circular section, and that the two boxes 24a, 24b indeed form a portion of a substantially cylindrical casing/cage of semi-circular section aligned along the longitudinal axis 34, as will also be described with reference to FIG. 5.

It is noted that to create the least possible disturbance of the secondary airstream leaving the annular fan duct 14, the diameter of the fictitious cylindrical surface 32 is preferably substantially identical to the diameter of the cylindrical outer surface 18 of the annular part of the fan case 12. Also, as can be seen FIG. 4, the elements of the central case 22 only project over a very short distance inside the space 38 delimited by the fictitious surface 32, so they do not significantly disturb the secondary flow either. This is attributable in particular to the fact that the side panels 30 are of very small height in direction Z compared with the diameter of the fictitious 32 and outer 18 surfaces.

Figure 5:
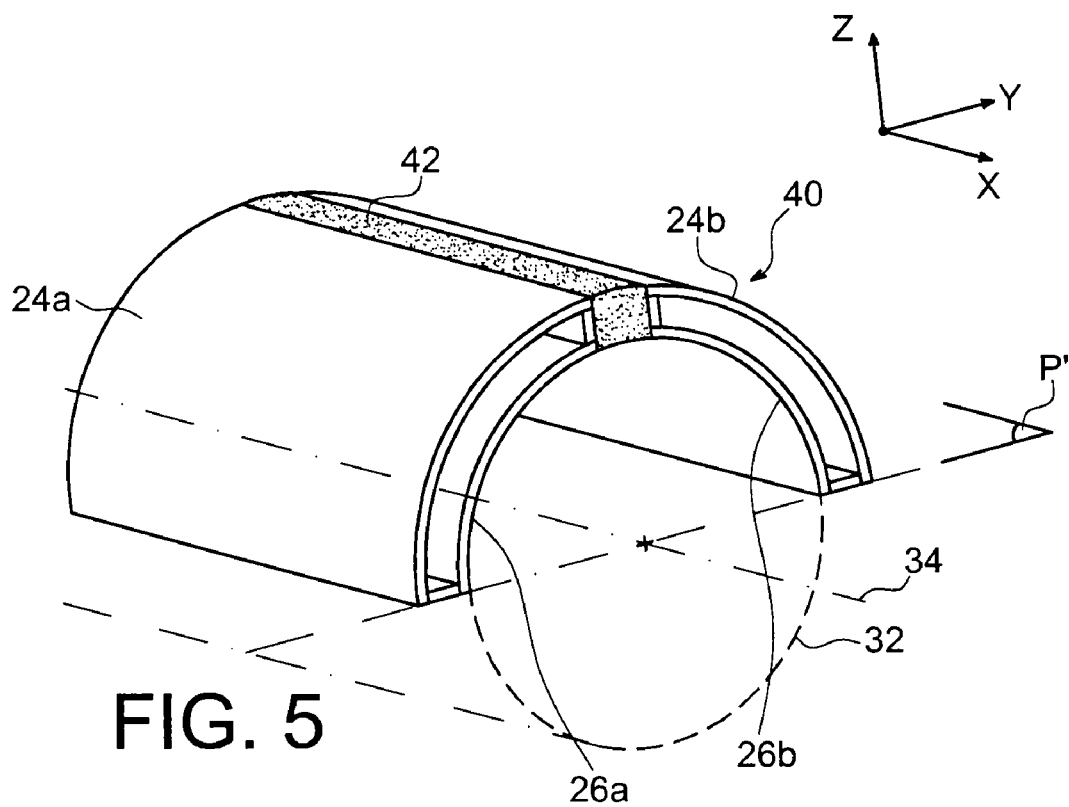
FIG. 5 is a perspective view intended to explain the shape of the side boxes designed to form part of the engine mount in FIG. 3.

For a schematic illustration of the preferred form of the side boxes 24a, 24b, FIG. 5 shows that these jointly form only a part of a substantially cylindrical casing/cage 40 of semicircular section, aligned along the longitudinal axis 34 and surrounding the upper half of the fictitious surface 32. Therefore in this FIG. 5 part 42, which is cross-hatched, corresponds to the missing part of the two boxes 24a, 24b to form the complete semi-cylinder 40. By way of indication, it is noted that on the engine mount shown FIGS. 3 and 4, this part 42 is in fact replaced by a part of the central case 22 projecting very slightly inside the fictitious surface 32 and joining the two boxes 24a, 24b. Also this illustration also explains the fact that these two side boxes substantially form an aft extension of the peripheral annular part of the fan case 12.

Figure 6:
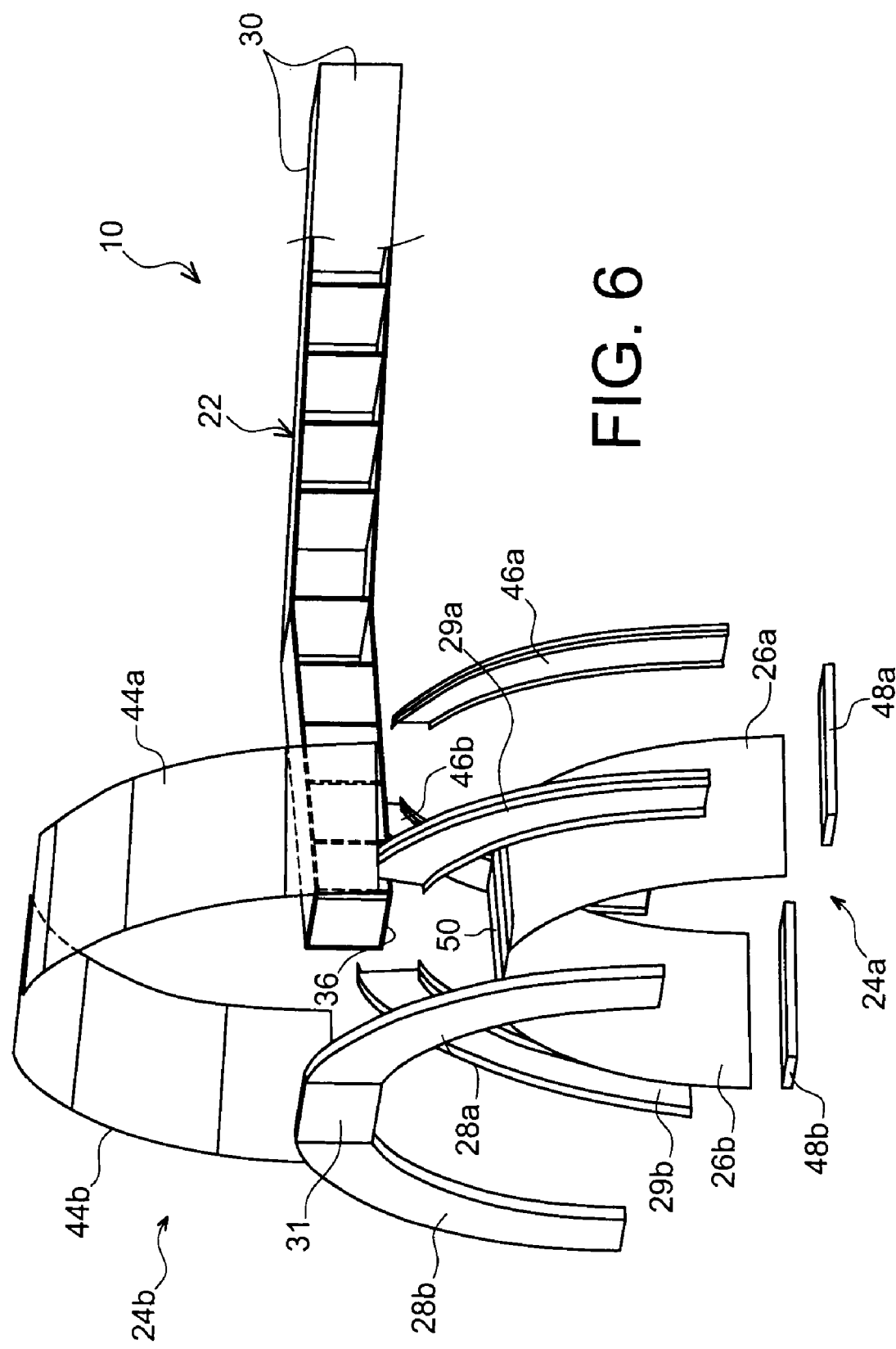
FIG. 6 is an exploded view of the one shown FIG. 3.
Figure 7:
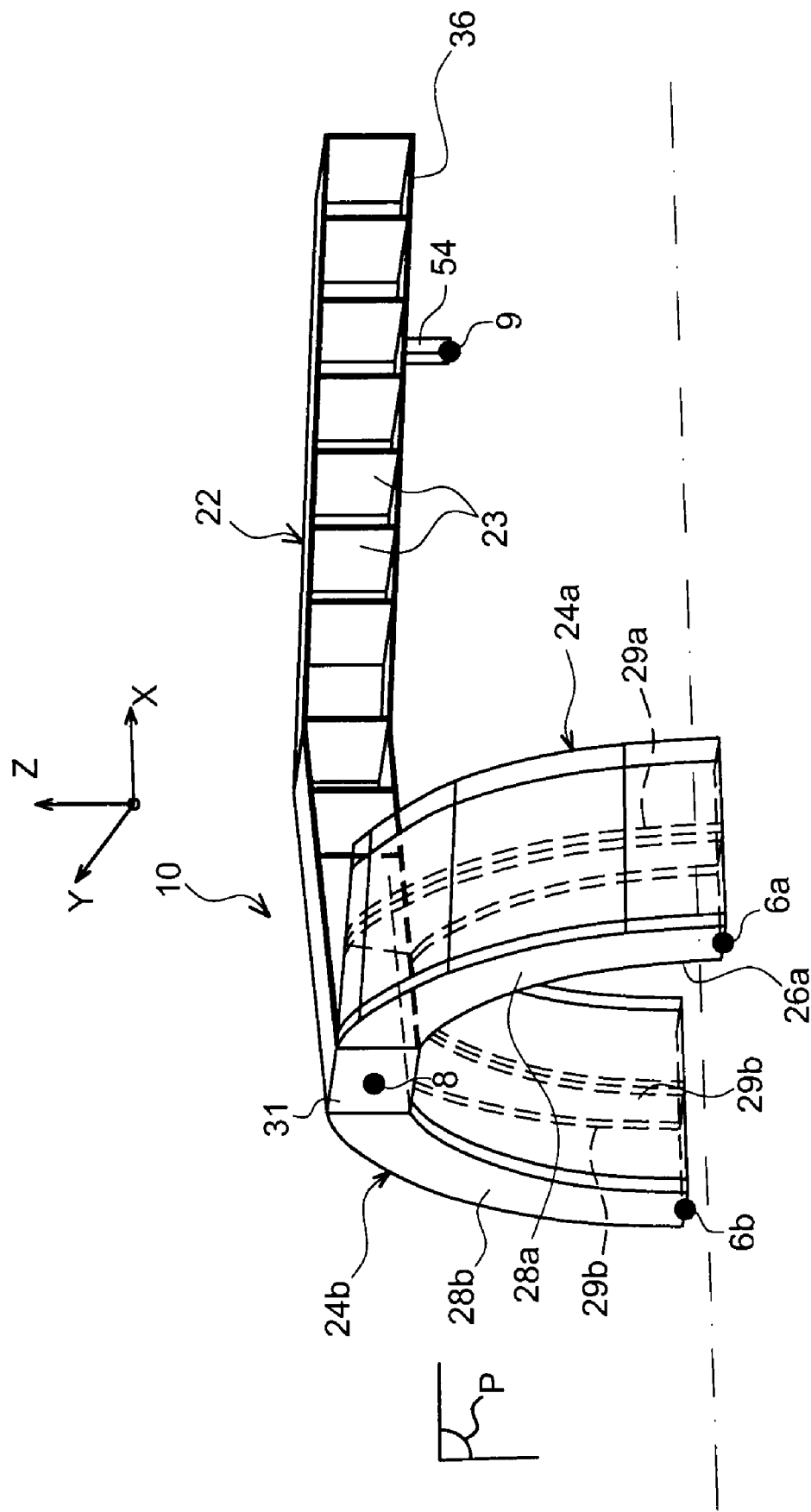
FIG. 7 is a similar view to the one shown FIG. 3, to which is added a diagram of the engine attachments of the engine mount.

With joint reference to FIGS. 6 and 7, it can be seen that the side box 24a, identical and symmetric to side box 24b, comprises the lower skin 26a parallel to direction X and forming a portion of a cylindrical element of circular section, and an upper skin 44a also parallel to direction X and also forming a portion of a cylindrical element of circular section. The skins 26a and 44a are preferably concentric.

The skins 26a, 44a are joined to each other via a forward closure frame 28a and an aft closure frame 46a, these frames 28a, 46a therefore being oriented transversally and respectively located at the forward and aft parts of box 24a. To reinforce the rigidity of box 24a, provision may also be made for an intermediate frame 29a joining the skins 26a, 44a and being located between the two closure frames 28a, 46a, this intermediate frame 29a therefore also acting as support for the lower and upper skins, and also being oriented transversally.

In addition, a closure plate 48a parallel to plane P' and preferably crossed by this same plane, comes to close a lower part of box 24a, and therefore joins together the lower end of the frames 28a, 46a and of the skins 26a, 44a.

Evidently, side box 24b comprises elements 26b, 44b, 28b, 29b, 46b and 48b, respectively identical to elements 26a, 44a, 28a, 29a, 46a and 48a of box 24a. Also, regarding the frames 28b, 29b, 46b, these are arranged symmetrically relative to frames 28a, 29a, 46a, along plane P.

As can be seen FIGS. 6 and 7, provision may be made so that the two lower skins 26a, 26b are made in a single piece and joined together at their upper part via a junction plate 50 oriented along a plane XY, and positioned in contact with the lower spar 36 of the central box 22. Evidently, this plate 50, of identical width to the lower spar 36, projects slightly inwardly inside the fictitious surface 32.

Similarly, it can also be provided that the two forward closure frames 28a, 28b are made in a single piece and joined together at their upper part via a forward closure frame 31 of the box 22, this frame 31 being oriented along a plane YZ. Therefore, in this configuration frames 28a, 28b, 31 made in a single piece are therefore arranged in one same plane YZ and form a forward end of the rigid structure 10 of the engine mount 4.

Also, it is noted that the upper ends of the aft closure frames 46a, 46b and of the skins 44a, 44b are secured onto the box 22 via means specific to the invention which are detailed below with reference to FIGS. 9 to 12. Additionally, while the joining of the upper ends of the intermediate frames 29a, 29b onto box 22 is not described, it is to be appreciated that this may be performed in similar manner to the method which will be described with reference to FIGS. 9 to 12 regarding the upper ends of the aft closure frames 46a, 46b.

With reference now to FIG. 7, it can be seen that the rigid structure 10 of the engine mount 4 is fully adapted to carry the forward engine attachments 6a, 6b, 8, since these can easily be secured to the transverse part made in a single piece integrating the frames 28a, 28b and 31. The first and second attachments 6a, 6b are respectively secured to the two lower ends of the two forward closure frames 28a, 28b so that plane P' passes through them, whilst the third attachment 8 is secured to the forward closure frame 31 located between the above-cited frames 28a, 28b. In this manner it can therefore be appreciated that the two forward engine attachments 6a, 6b are arranged symmetrically relative to the vertical plane defined by the longitudinal axis 34 and direction Z of the engine mount 4, and similarly the third engine attachment 8 is crossed by this same plane identical to the first plane P previously mentioned.

The aft engine attachment is secured below the central box 22 via a support 54 secured to the lower spar 36. This support 54 extends from lower spar 36, downwardly along direction Z, over a sufficiently long distance to allow attachment 9 to be mounted on the exhaust case 17 of the turbojet engine 2.

It is indicated that the entirety of the constituent elements of the rigid structure 10 just described is manufactured using metal materials, such as steel, aluminium, titanium, or using composite materials preferably carbon.

Figure 8:
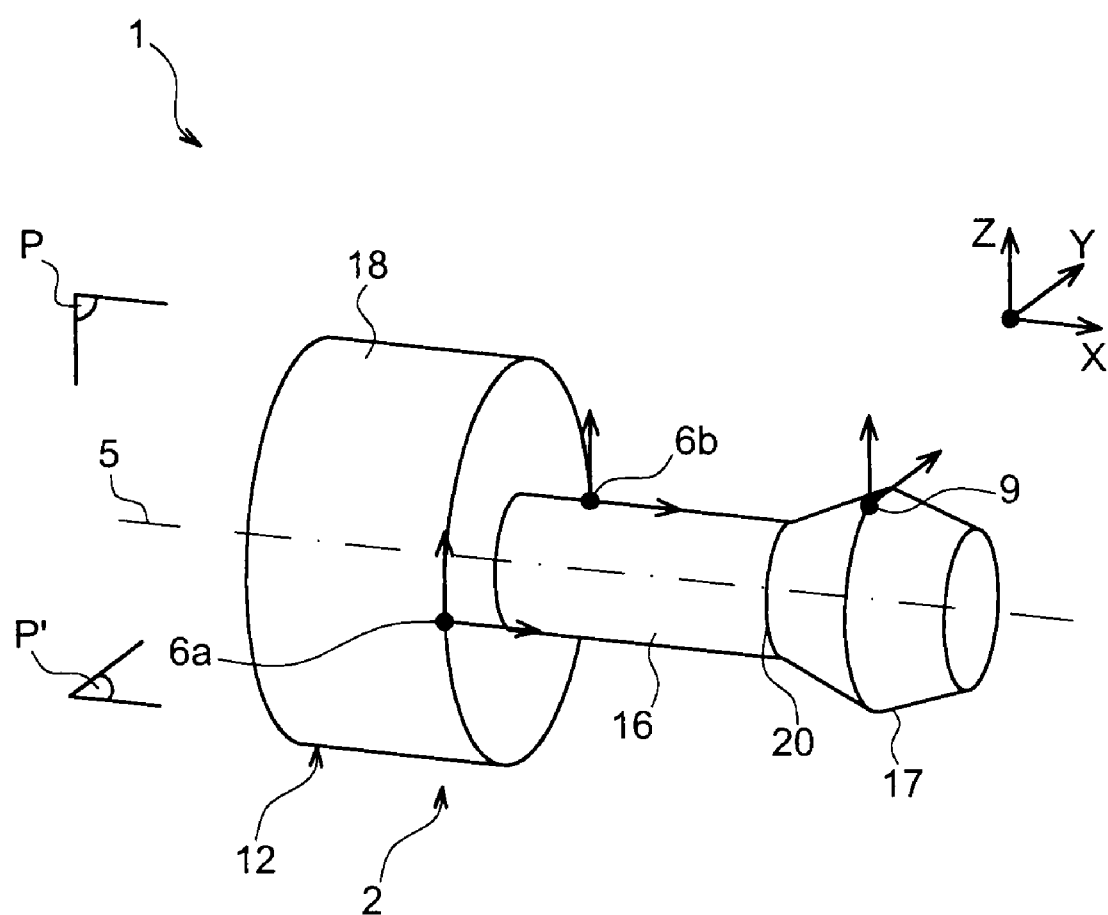
FIG. 8 is a similar view to the one shown FIG. 2, in which the engine attachments of the engine mount have an alternative form.

With reference to FIG. 8, an aircraft engine assembly 1 can be seen according to an alternative of the preferred embodiment presented above (the rigid structure of the engine mount not being shown). This assembly is similar to the one described above. Therefore the same reference numbers correspond to identical or similar parts.

The chief difference of this alternative consists of doing away with the third forward engine attachment, and making provision for the aft engine attachment 9 to ensure not only the transfer of loads exerted in direction Z, but also the transfer of loads exerted in direction Y. Therefore this alternative also provides a plurality of engine attachments forming an isostatic mounting system.

Figure 9:
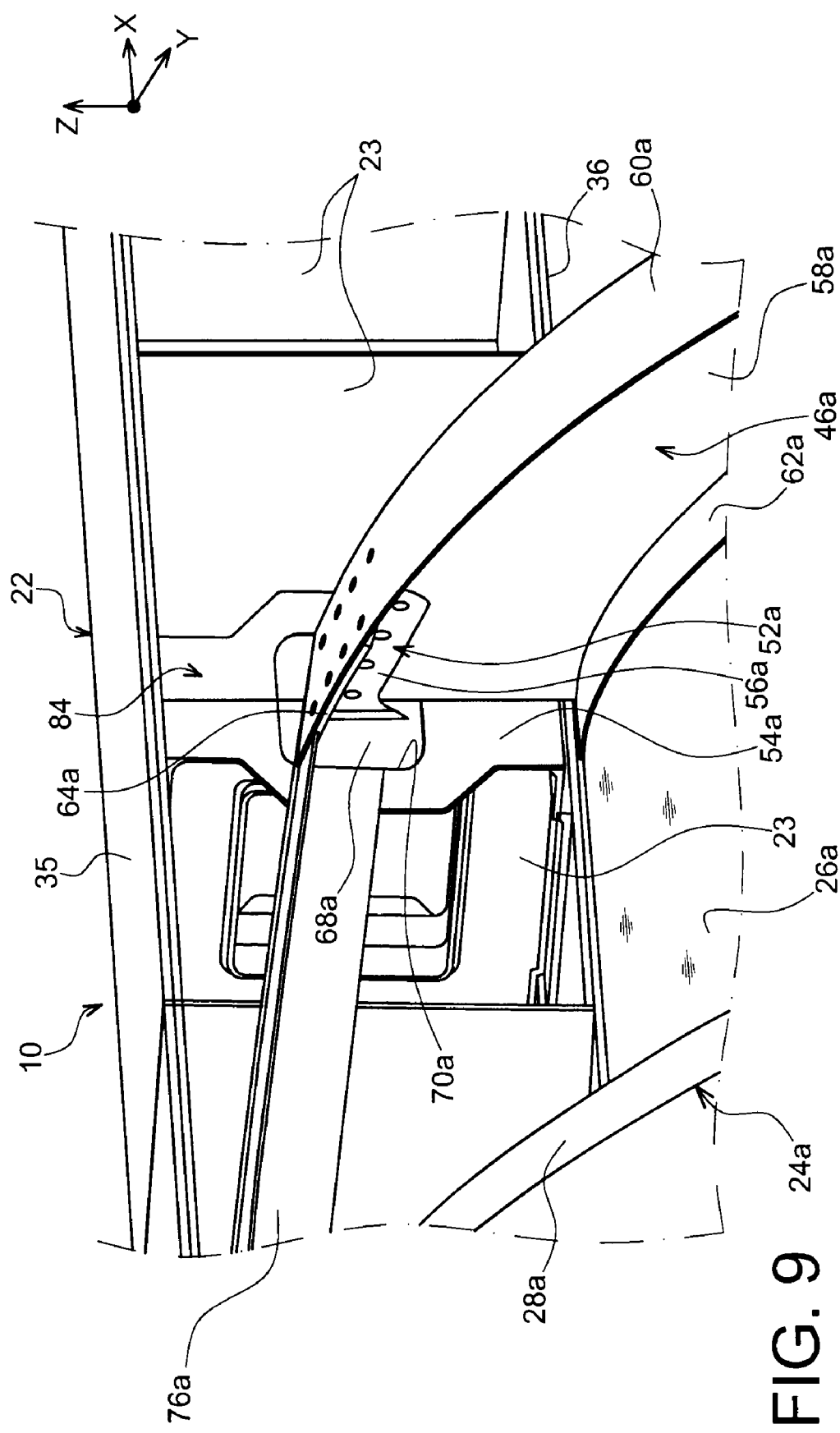
FIG. 9 is a magnified, detailed, perspective view of part of the engine mount shown FIG. 3.
Figure 10:
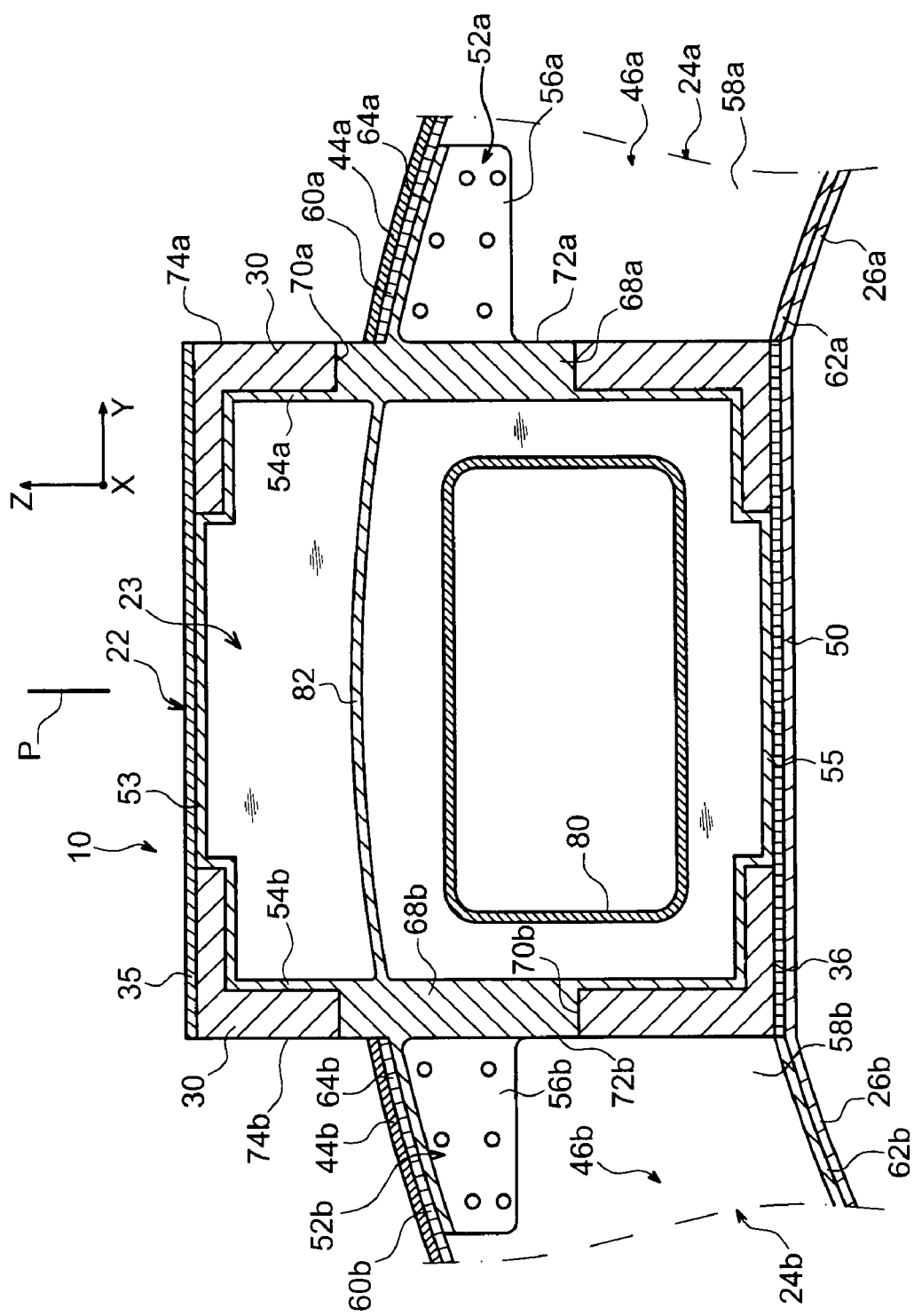
FIG. 10 is a cross-sectional view of the engine mount shown FIG. 9, along a plane passing through the transverse rib of the central case carrying the side extensions intended to join the aft closure frames of the side boxes.

With reference now to FIGS. 9 and 10, it can be seen that one of the particular aspects of the present invention lies in the fact that one of the transverse ribs 23 forming the central case 22 is provided with two side extensions 52a, 52b made in a single piece therewith, e.g. in a metal material such as titanium. These extensions are preferably located at an intermediate height between the height of the upper side wall 53 and that of the lower side wall 55 of rib 23, which are respectively arranged along planes XY in contact with the upper spar 35 and the lower spar 36 forming the box 22. This can be particularly accounted for by the fact that the aft closure frames 46a, 46b to which the extensions 52a, 52b are joined, each have an upper end preferably in contact with an intermediate part of the associated side panel 30, and not with an upper end part or lower end part thereof.

Each side extension 52a, 52b therefore globally extends in direction Y from one of the two side walls 54a, 54b of rib 23 and extends from its associated side panel 30, which means that each side extension 52a, 52b lies externally relative to the central case 22.

More precisely, concerning extension 52a, this extension comprises a first portion 56a fixedly mounted on a core 58a of the frame 46a, for example using assembly means of bolt type. This core 58a lies in a plane YZ and carries an upper bearing plate 60a and a lower bearing plate 62a, the outer surfaces of these two bearing plates being designed to act as securing support for the side box skins 44a, 26a with which they are in contact, as can be clearly seen FIG. 10. Therefore, the first portion 56a also lies in a plane YZ, in planar contact with the core on which it is fixedly mounted.

Also, extension 52a comprises a second portion 64a fixedly mounted on the upper bearing plate 60a of frame 46a, for example using assembly means of bolt type. Therefore, the second portion 64a has a shape adapted to follow the curved profile of the upper bearing plate 60a. It is preferably in contact with a lower surface of the bearing plate 60a on which it is fixedly mounted, as can be clearly seen FIG. 10.

Also, it is noted that the two portions of extension 56a, 64a extend over a substantially identical length along the frame 46a, and preferably have a common edge so that they form an L-shaped section.

The extension 52a is not directly in contact with the side walls 54 extending along a plane XZ, since provision is made to insert a support 68a for side extension between this same side wall 54a and the extension 52a. This support 68a, made in the same piece as the other above-cited elements, is effectively in the form an allowance along direction Y, extending outwardly from the side wall 54a. As is best visible FIG. 10, its function is to block off an extension throughway 70a made in the adjacent side panel 30. It is specified that this throughway 70a is made so that the panel 30 can be installed after placing the rib 23 in place on the box 22, evidently such that the extension 52a passes through the throughway 70a when placing the side panel 30 in position.

Closing of the throughway 70a is sought so that it is possible to maintain the seal of the box 22, despite the presence of this necessary throughway to enable positioning of the side panel 30 which laterally closes the central box 22.

So as to ensure good aerodynamic continuity on the side outer surface of the central box essentially formed by the outer surface of the side panel 30, provision is made so that an outer surface 72a of the extension support 68a lies substantially in a same plane as the outer surface 74a of the above-mentioned side panel, as can be clearly seen FIG. 10.

In this respect it is noted that insofar as the side wall 54a of rib 23 is in contact with an inner surface of the side panel 30, the thickness of the extension 68a is substantially identical to the thickness of this same panel 30.

Regarding extension 52b, solely visible in FIG. 10, this extension is the symmetry of extension 52a relative to plane P, which moreover preferably forms a plane of symmetry for the entire part made in a single piece and integrating the rib 23.

Therefore extension 52b comprises a first portion 56b fixedly mounted on a core 58b of the closure frame 46b, e.g. using assembly means of bolt type. This core 58b lies in a plane YZ and carries an upper bearing plate 60b and a lower bearing plate 62b, the outer surfaces of these two bearing plates being designed to act as securing support for the side box skins 44b, 26b with which they are in contact. Therefore, the first portion 56b also lies in a plane YZ, in planar contact with the core on which it is fixedly mounted.

Extension 52b also comprises a second portion 64b fixedly mounted on the upper bearing plate 60b of frame 46b, for example using assembly means of bolt type. Therefore the second portion 64b has a shape adapted to follow the curved profile of the upper bearing plate 60b. It is preferably in contact with a lower surface of the bearing plate 60b on which it is fixedly mounted.

Also, it is noted that the two portions of the extension 56b, 64b extend over a substantially identical length along the frame 46b, and preferably have a common edge so that they form an L-shaped section.

Extension 52b is not directly in contact with the side wall 54b opposite side wall 54a extending along a plane XZ, since provision is made to insert a support 68b for side extension between this same side wall 54b and extension 52b. This support 68b, made in the same piece as the other above-cited elements, is effectively in the form of an allowance along direction Y, extending outwardly from the side wall 54b. Here again its function is to block off an extension throughway 70b made in the adjacent side panel 30 so that it is possible to install this panel after the rib 23 has been placed in position on the box 22, evidently by ensuring that the extension 52b passes through the throughway 70b during the positioning of side panel 30.

Closing of the throughway 70b is desired so that it is possible to maintain sealing of the box 22. Also, still with the same concern to ensure good aerodynamic continuity on the side outer surface of the central box essentially formed by the outer surface of the side panel 30, provision is made so that an outer surface 72b of the extension support 68b lies substantially in a same plane as the outer surface 74b of the above-mentioned side panel.

Here again it is noted that insofar as the side wall 54b of the rib 23 is in contact with an inner surface of the side panel 30, the thickness of the extension support 68b is substantially identical to the thickness of this same panel 30.

Again with reference to FIG. 9, it can be seen that the securing of the side box 24a onto box 22 is also made by mounting a corner bracket 76a on the side panel 30, between the two upper ends of the closure frames 28a and 46a. This corner bracket 76a can then act as support for the skin 44a, which also rests on the upper bearing plates of the two frames 28a and 46a. A similar arrangement is evidently provided for the securing of side box 24b.

FIG. 10 shows that the rib 23 may have a central opening 80, making it possible to reduce its overall weight. Also it may comprise a reinforcement 82 extending roughly along direction Y. More precisely this reinforcement 82, made in a single piece with the remainder of the part, can have a curvature similar to the curvature of the upper bearing plates of frames 46a, 46b, and may have two side ends located substantially and respectively in the continuity of these two upper bearing plates 60a, 60b, or else substantially and respectively in the continuity of the two second portions 64a, 64b. With this specificity it is possible to ensure continuity for the transfer of loads transiting via the transverse rib 23.

Figure 11:
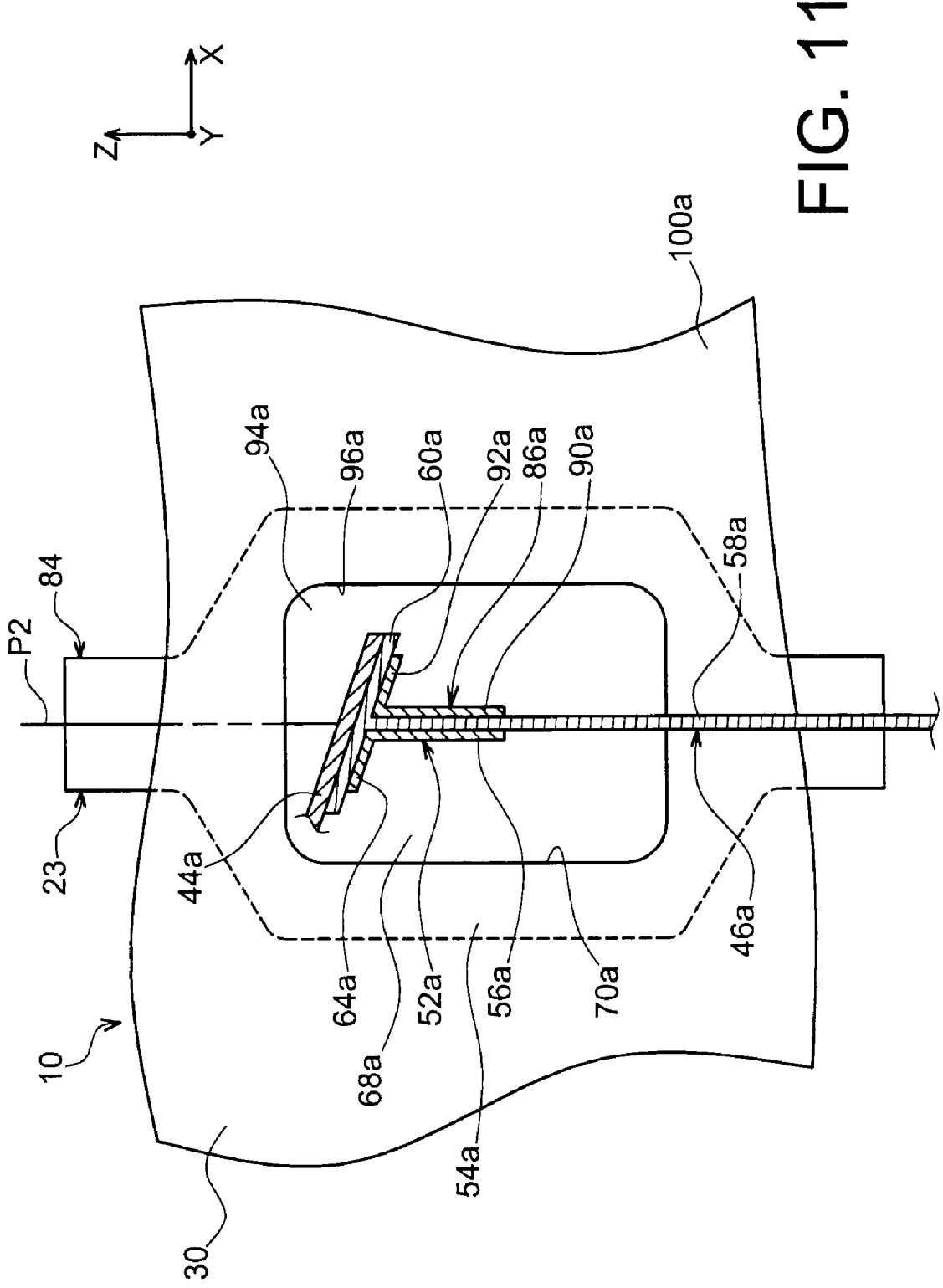
FIG. 11 is a longitudinal section of the engine mount shown FIG. 9, along a plane passing through one of the two side extensions.

With reference now to FIG. 11, it can be seen that the engine mount may comprise an additional transverse rib 84 arranged superimposed over the above-described rib 23, along direction X. It can consolidate the mechanical support of the aft closure frames 6a, 46b, or may provide a failsafe function in the event of rupture or failure of the part made in a single piece and integrating the rib 23.

The two ribs 23, 84 are therefore in surface contact along a plane P2 oriented along directions Y and Z.

Figure 12:
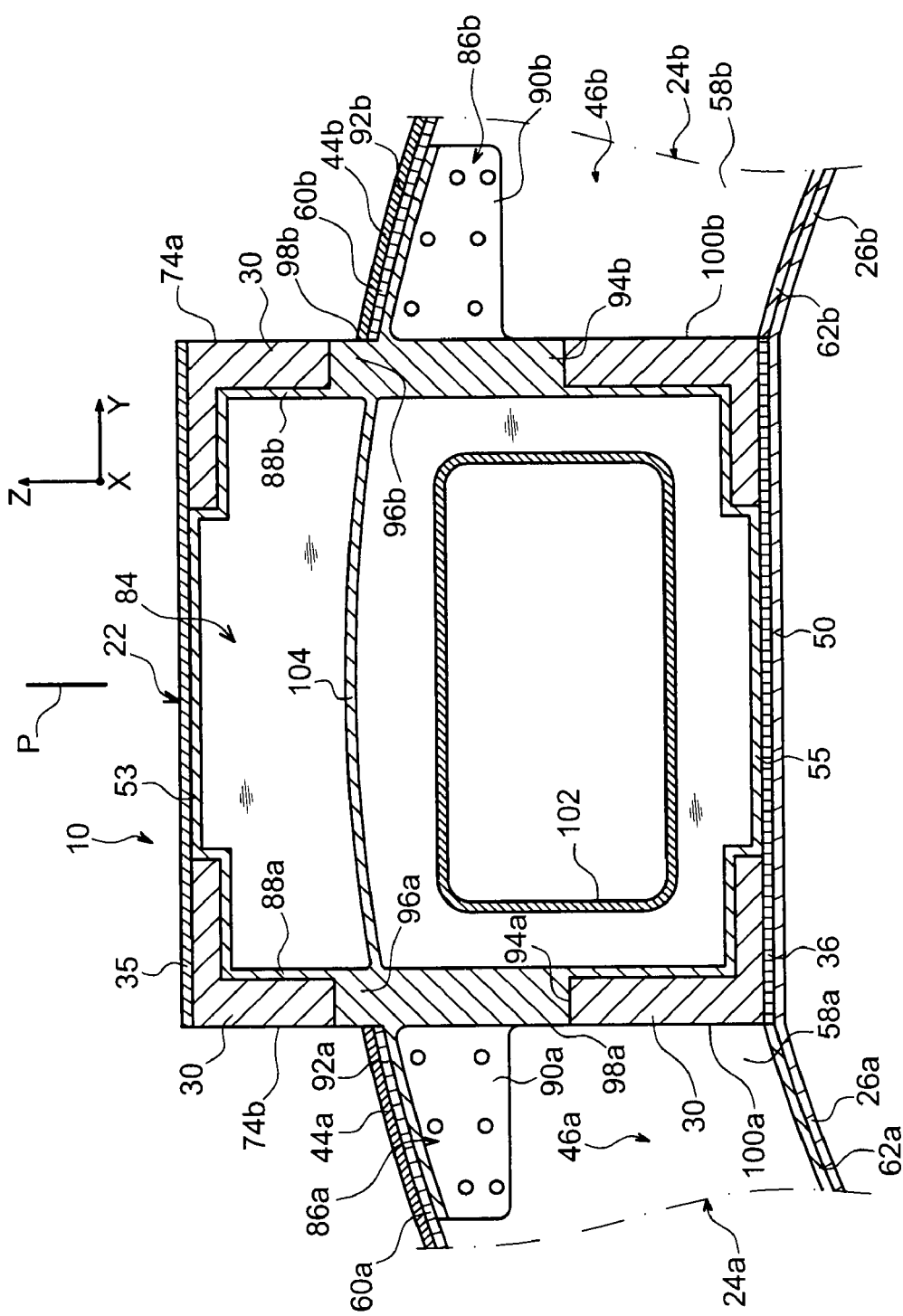
FIG. 12 is a cross-sectional view of the engine mount shown FIG. 9, along a plane passing through the additional transverse rib carrying the additional side extensions intended to join the aft closure frames of the side boxes.

With reference to FIG. 12 giving a rear view of the additional rib 84, it can be seen that this rib is integrated in a part made in a single piece similar to the one described above and integrating the rib 23.

The additional rib 84 is effectively provided with two additional side extensions 86a, 86b made in a single piece therewith, e.g. in a metal material such as titanium.

Each side extension 86a, 86b therefore globally extends in direction Y from one of the two side walls 88a, 88b of the rib 84 to project from its associated side panel 30, which means that each side extension 86a, 86b lies externally relative to the central box 22.

More precisely, regarding extension 86a, this extension comprises a first portion 90a fixedly mounted on the core 58a of frame 46a, for example using bolt type assembly means. As can be seen FIG. 11, the first portions 56a, 90a are arranged in contact with and either side of the core 58a, portion 56a lying on the inner side of the box 24a, and portion 90a lying on the outer side of this same box. Therefore the first portion 90a also lies in a plane YZ, in planar contact with the core on which it is fixedly mounted.

Also, extension 86a comprises a second portion 92a fixedly mounted on the upper bearing plate 60a of frame 46a, for example using assembly means of bolt type. Therefore the second portion 92a has a shape adapted to follow the curved profile of the upper bearing plate 60a. It is preferably in contact with a lower surface of the bearing plate 60a, on the outer side of box 24a, unlike the second portion 64a of extension 52a which lies on the outer side of this box 24a as can clearly be seen FIG. 11.

Additionally, it is noted that the two portions of the extension 90a, 92a extend over a substantially identical length along the frame 46a, and preferably have a common edge so that they form an L-shaped section.

The additional extension 86a is not directly in contact with the side wall 88a extending along a plane XZ, since it is provided to insert a support 94a for side extension between this same side wall 88a and extension 86a. This support 94a made in the same piece as the other above-cited elements is in the form of an allowance along direction Y, extending outwardly from the side wall 88a. As is better visible FIG. 12, its function is to block off an extension throughway 96a made in the adjacent side panel 30. It is specified that this throughway 96a is provided for the purpose of installing the panel 30 after placing the rib 84 in position on the box 22, evidently such that the extension 86a passes through the throughway 96a when positioning the side panel 30.

Closing of the throughway 96a is desired so as to maintain the seal of the box 22 despite the presence of this throughway required to enable the placing in position of the side panel 30 which closes the central box 22 laterally.

In this respect it is indicated, as is best visible FIG. 11, that the two throughways 70a, 96a made in the same side panel 30 form a single throughway e.g. of rectangular shape which is closed by the two supports 68a, 94a arranged adjacently in direction X.

So as to be able to ensure good aerodynamic continuity on the side outer surface of the central box essentially consisting of the outer surface of side panel 30, provision is made so that an outer surface 98a of the extension support 94a lies substantially in a same plane as the outer surface 100a of the above-mentioned side panel, as can be clearly seen FIG. 12.

In this respect, it is noted that insofar as the side wall 88a of rib 84 is in contact with an inner surface of the side panel 30, the thickness of the extension support 94a is substantially identical to the thickness of this same panel 30.

Regarding extension 86b, this is the symmetry of extension 86a relative to plane P, which preferably forms a plane of symmetry for the entire part made in a single piece and integrating the rib 84.

Therefore, extension 86b comprises a first portion 90b fixedly mounted on the core 58b of the closure frame 46b, for example using bolt type assembly means, and again so that the first portions 56b, 90b are arranged either side of the core 58b. Therefore, the first portion 90b also lies in a plane YZ, in planar contact with the core on which it is fixedly mounted.

Extension 86b also comprises a second portion 92b fixedly mounted on the upper bearing plate 60b of frame 46b, for example using bolt type assembly means. Therefore, the second portion 92b has a shape that is adapted to follow the curved profile of the upper bearing plate 60b. It is preferably in contact with a lower surface of the bearing plate 60b, on which it is fixedly mounted preferably on the outer side of the box 24b.

Also, it is noted that the two portions of extension 90b, 92b extend over a substantially identical length along the frame 46b, and preferably have a common edge so that they form an element of L-shaped section.

Extension 86b is not in direct contact with the side wall 88b opposite side wall 88a and extending along a plane XZ, since provision is made to insert a support 94b for side extension between this same side wall 88b and extension 86b. This support 94b made in the same piece as the other above-cited elements is in the form of an allowance along direction Y, extending outwardly from the side wall 88b. Here again, its function is to block off an extension throughway 96b made in the adjacent side wall 30 for the purpose of installing this panel after placing the rib 84 in position on the box 22, evidently so that the extension 86b passes through throughway 96b when positioning the side panel 30.

The closing of throughway 96b, forming a single throughway with the above-cited throughway 70b, is sought so that it is possible to maintain the sealing of the box 22. Also, still for the purpose of ensuring good aerodynamic continuity on the side outer surface of the central box, essentially consisting of the outer surface of the side panel 30, provision is made so that an outer surface 98b of the extension support 94b lies substantially in a same plane as the outer surface 100b of the above-cited side panel.

Here again, it is noted that insofar as the side wall 88b of the rib 84 is in contact with an inner surface of the side panel 30, the thickness of the extension support 94b is substantially identical to the thickness of this same panel 30.

FIG. 12 shows that the rib 84 may have a central opening 102, making it possible to reduce the overall weight thereof, and which is located in the aft continuity of opening 80 made in rib 23. Also, it may comprise a reinforcement 104 roughly extending along direction Y, preferably in the aft continuity of the above-cited reinforcement 82. More precisely, this reinforcement 104 made in a single piece with the remainder of the part may have a similar curvature to the curvature of the upper bearing plates of frames 46a, 46b, and may have two side ends located substantially and respectively in the continuity of these two upper bearing plates 60a, 60b, or else substantially and respectively in the continuity of the two second portions 92a, 92b. With this specificity it is possible to ensure continuity in the transfer of loads transiting via the transverse rib 84.

Evidently, various modifications may be made by those skilled in the art to the mount 4 for aircraft turbojet engine 2 just described, solely as a non-limiting example. In this respect, it can be indicated in particular that while the engine mount 4 has been presented in a configuration adapted for its mounting below the aircraft wing, this engine mount 4 could also have a different configuration allowing it to be mounted above this same wing, even to an aft part of the aircraft fuselage.

Also, while the description describes in detail the preferred application of the invention to ensure joining of the aft closure frames of the side boxes, it is noted that the invention could also apply either simultaneously or alternatively to the joining of the intermediate frames or the forward closure frames presented above. The latter envisioned case is evidently applicable when the two forward closure frames are not made in a single piece as described previously. It can be used in particular if the design of the rigid structure is such that the longitudinal central box extends more forwardly than the two side boxes.

The invention claimed is:

1. An engine mount for an aircraft turbojet engine, the engine mount comprising:
a rigid structure comprising a longitudinal central box formed by an assembly of two side panels joined via first stationary transverse ribs, the rigid structure further comprising two side boxes secured to a forward part of the central box and arranged on either side thereof, each side box comprising at least one frame,
wherein one of the first transverse ribs forming the longitudinal central box comprises two side extensions made in a single piece with said one of the first ribs and respectively projecting through extension throughways in the side panels outwardly from the longitudinal central box, the two side extensions being fixedly mounted on the frame of each the two side boxes, respectively.

2. An aircraft engine mount according to claim 1, wherein for each of the two side boxes, the frame on which the two side extensions are fixedly mounted is a box element from among a forward closure frame, an aft closure frame, and an intermediate frame located inside the box.

3. The aircraft engine mount according to claim 1, wherein for each of the two side boxes, the frame on which the two side extensions are fixedly mounted is an aft closure frame of the box.

4. The aircraft engine mount according to claim 3, wherein the aft closure frame of each of the two side boxes comprises a core on either side of which comprising a lower bearing plate and an upper bearing plate, the side extensions each comprises a first portion fixedly mounted on the core of its associated closure frame.

5. The aircraft engine mount according to claim 4, wherein the side extensions each comprise a second portion fixedly mounted on the upper bearing plate of its associated closure frame.

6. The aircraft engine mount according to claim 3, wherein each of the extensions is joined to the one first transverse rib via an extension support also made in a single piece with the one first transverse rib and the two side extensions, the extension support configured to close the extension throughway made in the associated side panel.

7. The aircraft engine mount according to claim 6, wherein for each of the two side extensions, an outer surface of the extension support is located substantially in a same plane as an outer surface of the associated side panel.

8. The aircraft engine mount according to claim 3, further comprising a second transverse rib superimposed over the one first transverse rib comprising the two side extensions, the second transverse rib also comprising two additional side extensions made in a single piece with the one first transverse rib and respectively projecting from the two side panels of the longitudinal central box, outwardly from the box, the two additional side extensions being fixedly mounted on the aft closure frame of each of the two side boxes, respectively.

9. The aircraft engine mount according to claim 8, wherein for each of the two side boxes, one of the side extensions and one of the additional side extensions are arranged on either side of a core of the aft closure frame.

10. The aircraft engine mount according to claim 8, wherein the aft frame of each of the two side boxes comprises a core on either side of which comprising a lower bearing plate and an upper bearing plate, the additional side extensions each comprising a first portion fixedly mounted on the core of its associated closure frame.

11. The aircraft engine mount according to claim 10, wherein the additional side extensions each comprise a second portion fixedly mounted on the upper bearing plate of its associated closure frame.

12. The aircraft engine mount according to claim 8, wherein each of the additional side extensions is joined to the second transverse rib via a support for additional extension, also made in a single piece with the second transverse rib and the two additional side extensions, the support for additional extension configured to close a throughway for additional extension made in the associated side panel.

13. The aircraft engine mount according to claim 12, wherein for each of the two additional side extensions, an outer surface of the support for additional extension is located substantially in a same plane as an outer surface of the associated side panel.

14. The aircraft engine mount according to claim 12, wherein for each of the two side panels of the longitudinal central box, the extension throughway and the throughway for additional extension jointly form a single throughway closed by the extension supports and supports for additional extension.

15. An aircraft comprising at least one engine mount according to claim 1.

* * * * *